United States Patent
Zeuch et al.

(10) Patent No.: US 10,033,219 B2
(45) Date of Patent: Jul. 24, 2018

(54) ENERGY SUPPLY DEVICE HAVING TRANSITIONS BETWEEN OPERATION AND STAND-BY THAT ARE DEPENDENT ON THE OUTPUT CURRENT

(71) Applicant: Phoenix Contact GmbH Co. KG, Blomberg (DE)

(72) Inventors: Jochen Zeuch, Blomberg (DE); Hartmut Henkel, Blomberg (DE)

(73) Assignee: Phoenix Contact GmbH Co. KG, Blomberg (DE)

( * ) Notice: Subject to any disclaimer, the term of this patent is extended or adjusted under 35 U.S.C. 154(b) by 0 days.

(21) Appl. No.: 15/314,218

(22) PCT Filed: Mar. 24, 2015

(86) PCT No.: PCT/EP2015/056303
§ 371 (c)(1),
(2) Date: Nov. 28, 2016

(87) PCT Pub. No.: WO2015/180861
PCT Pub. Date: Dec. 3, 2015

(65) Prior Publication Data
US 2017/0194812 A1    Jul. 6, 2017

(30) Foreign Application Priority Data

May 28, 2014  (DE) .................... 10 2014 107 545

(51) Int. Cl.
*H02M 7/06*    (2006.01)
*H02J 9/00*    (2006.01)
*H02M 1/00*    (2006.01)

(52) U.S. Cl.
CPC .......... *H02J 9/005* (2013.01); *H02J 2009/007* (2013.01); *H02M 2001/0032* (2013.01)

(58) Field of Classification Search
CPC ............ H01F 38/20; H01F 38/24; G05F 1/56; H02M 7/06
(Continued)

(56) References Cited

U.S. PATENT DOCUMENTS 5,220,495 A * 6/1993 Zulaski ................ G01R 15/144
                                                     320/148
6,292,501 B1 * 9/2001 DuBose .................. H01S 5/042
                                                     323/355
(Continued)

FOREIGN PATENT DOCUMENTS

DE    198 11 353 C1    7/1999
DE    101 20 790 A1    11/2002
(Continued)

OTHER PUBLICATIONS

ISA/EP International Search Report, Int'l Application No. PCT/EP2015/056303, dated Jun. 18, 2015, European Patent Office, Rijswijk, NL, 38 pgs.

*Primary Examiner* — Jeffrey Sterrett
(74) *Attorney, Agent, or Firm* — Holland & Hart LLP

(57) ABSTRACT

The present disclosure relates to an energy supply device for providing an output voltage and an output current. The device includes a first operating state, a second operating state, a measuring assembly, and a signal generator. The measuring assembly is configured to sense a current amplitude of the output current of the energy supply device. The signal generator is configured to produce the output voltage and the output current. The signal generator is further configured to reduce a voltage amplitude of the output voltage of the energy supply device in the first operating state to change to the second operating state if the sensed current amplitude falls below a first current threshold value and to increase a voltage amplitude of the output voltage of the energy supply device in the second operating to change (Continued)

US 10,033,219 B2

Page 2 to the first operating state if the sensed current amplitude exceeds a second current threshold value.

19 Claims, 7 Drawing Sheets

(58) Field of Classification Search
USPC .................. 323/355, 359, 274, 277; 363/89
See application file for complete search history.

(56) References Cited

U.S. PATENT DOCUMENTS

| | | | |
|---|---|---|---|
| 6,320,766 B1 * | 11/2001 | Park | H02M 3/33507 363/21.09 |
| 6,577,111 B1 * | 6/2003 | Dickmander | H02M 3/33507 323/356 |
| 7,064,531 B1 | 6/2006 | Zinn | |
| 7,248,533 B2 | 7/2007 | Aimoto | |
| 8,533,508 B2 * | 9/2013 | Chang | G06F 1/3218 323/221 |
| 8,976,543 B1 * | 3/2015 | Zheng | H02M 1/38 363/17 |
| 2003/0067287 A1 | 4/2003 | Morgen | |
| 2004/0066662 A1 | 4/2004 | Park | |
| 2005/0046399 A1 | 3/2005 | Gan et al. | |
| 2009/0108822 A1 | 4/2009 | Hoshino et al. | |
| 2013/0322138 A1 | 12/2013 | Atkinson | |
| 2015/0236590 A1 * | 8/2015 | Yonezawa | H02M 1/08 323/271 |
| 2017/0054361 A1 * | 2/2017 | Henkel | H02H 3/05 |
| 2017/0194812 A1 * | 7/2017 | Zeuch | H02J 9/005 |

FOREIGN PATENT DOCUMENTS

| | | |
|---|---|---|
| DE | 10 2007 052 880 A1 | 11/2007 |
| DE | 10 2007 031 053 A1 | 1/2009 |

* cited by examiner

ENERGY SUPPLY DEVICE HAVING TRANSITIONS BETWEEN OPERATION AND STAND-BY THAT ARE DEPENDENT ON THE OUTPUT CURRENT

CROSS-REFERENCE TO RELATED APPLICATIONS

The present application is a 371 national phase filing of International Application No. PCT/EP2015/056303, entitled "ENERGY SUPPLY DEVICE HAVING TRANSITIONS BETWEEN OPERATION AND STAND-BY THAT ARE DEPENDENT ON THE OUTPUT CURRENT", filed 24 Mar. 2015, which claims priority to German Patent Application No. 10 2014 107 545.5, entitled "ENERGIEVERSORGUNGSGERÄT", filed 28 May 2014.

BACKGROUND

The present disclosure relates to an energy supply device, in particular a power supply unit.

An energy supply device, such as a power supply unit, is an independent device or a subassembly for supplying energy to devices or subassemblies which require voltages and currents other than those provided by the energy supply network.

An electrical energy supply device usually operates independently of the load connected to the energy supply device as soon as an input voltage has been applied to the energy supply device.

If a load connected to the energy supply device changes to stand-by operation, the energy supply device usually still provides the input voltage applied to the power supply to the connected load. If the energy supply for the energy supply device with a connected load is switched off, a switching unit, for example a contactor, is usually connected upstream in order to counteract an increased build-up of voltage at the energy supply device and the load, which are electrically connected to one another, while the energy supply is switched off.

If switched on again from a switched-off state, for example the stand-by state, auxiliary energy is usually needed to change the energy supply device from its stand-by state to the active state again. Therefore, some energy supply devices have a digital input in order to switch the energy supply device on or off with a fixed level. A control input which is controlled by a controller is required for this purpose.

The document DE 196 00 962 A1 discloses a switched mode power supply unit having stand-by operation. In order to change over from the stand-by operation to the normal operation, the signal at a connection for opening a switch is turned off, with the result that the output voltages are regulated again via a Zener diode.

SUMMARY

The object on which the disclosure is based is to specify an energy supply device and a method which independently and efficiently changes over the energy supply device between two operating states of the energy supply device.

This object is achieved by means of the subject matters of the independent patent claims. The figures, the description and the dependent claims relate to advantageous examples of the principles of this disclosure.

The present disclosure is based on the knowledge that the energy supply device can be independently and efficiently changed over between a first operating state and a second operating state by sensing the current amplitude at the output of the energy supply device.

According to a first aspect of the disclosure, the object is achieved by means of an energy supply device for providing an output voltage and an output current, the energy supply device having a first operating state and a second operating state. The energy supply device has a measuring assembly for sensing a current amplitude of the output current of the energy supply device, and a signal generator for producing the output voltage and the output current. The signal generator is designed to reduce a voltage amplitude of the output voltage of the energy supply device in the first operating state of the energy supply device in order to change to the second operating state if the sensed current amplitude falls below a first current threshold value. The signal generator is also designed to increase a voltage amplitude of the output voltage of the energy supply device in the second operating state of the energy supply device in order to change to the first operating state if the sensed current amplitude exceeds a second current threshold value.

The output power and therefore the output voltage and the output current have a higher absolute value in the first operating state than in the second operating state.

The transition of the energy supply device from the first operating state to the second operating state causes a reduction in the output voltage of the energy supply device by 30% to 80%, for example, or by 50%, for example. The signal generator reduces the voltage amplitude of the output voltage of the energy supply device from 24 V to 10-12 V, for example, in order to change from the first operating state to the second operating state.

The signal generator reduces the output current of the energy supply device by 5-20% or more below the rated current in order to change from the first operating state to the second operating state.

The measuring assembly repeatedly records the current amplitude of the output current at intervals of time. The signal generator compares the sensed current amplitude with the first and second current threshold values which can be or are stored in a memory of the signal generator.

The energy supply device is a power supply unit, for example.

The energy supply device according to the disclosure achieves the advantage that a transition between the first operating state and the second operating state of the energy supply device is automatically effected.

In one advantageous example of the energy supply device, the first operating state is an active state, and the second operating state is an energy-saving state, in particular a stand-by mode or a sleep mode. In the active state, the output voltage and the output current are each set to a value which allows operation of the electrical device connected to the energy supply device, whereas, in the energy-saving state, the output voltage and the output current are each set to a value which restricts operation of the electrical device connected to the energy supply device.

This achieves the advantage that energy can be automatically saved.

In one advantageous example of the energy supply device, the second current threshold value is the first current threshold value or a further current threshold value. In a converted form, the first current threshold value is 5%-20% or more below the amplitude of the output current in the first operating state, for example.

If the first current threshold value is equal to the second current threshold value, a transition of the energy supply device from its second operating state to the first operating state is effected if the first current threshold value is exceeded again, for example.

If the absolute value of the second current threshold value is higher than that of the first current threshold value, a transition of the energy supply device from its second operating state to the first operating state is effected only if the second current threshold value has been reached or exceeded.

If the absolute value of the second current threshold value is lower than that of the first current threshold value, a transition of the energy supply device from the second operating state to the first operating state is already effected if the second current threshold value has been reached or exceeded. For example, the second current threshold value is lower than the first current threshold value in order to also enable a transition of the energy supply device from its second operating state to the first operating state for an electrical load which is connected to the energy supply device and whose load current and load voltage are below a minimum load current and a minimum load voltage.

The second current threshold value achieves the advantage that, if the second current threshold value is exceeded by the load current of a load connected to the energy supply device, the energy supply device changes from the second operating state to the first operating state automatically without the use of an additional energy source.

In one advantageous example of the energy supply device, the first current threshold value or the second current threshold value or the further current threshold value is settable or prestored. Depending on the load connected to the energy supply device, the first current threshold value and the second current threshold value can be set or prestored current threshold values can be used to change the energy supply device from its first operating state to its second operating state and vice versa.

This achieves the advantage that the energy supply device can be used in a flexible manner, in particular for consumers having different load currents and load voltages, and the automatic transition from the first operating state to the second operating state and vice versa is not lost in the process.

In one advantageous example of the energy supply device, the signal generator is designed to compare the sensed current amplitude with the first current threshold value or the second current threshold value or the further current threshold value. The signal generator repeatedly compares the sensed current amplitude with the current threshold values at predetermined times. The predetermined times are preferably given at times after expiry of equidistant intervals of time which are in the seconds range, for example. The current amplitude is sensed by the measuring assembly after expiry of 30, 20, 10 or 5 seconds in each case, for example, and is then compared with the first current threshold value or the second current threshold value or the further current threshold value by the signal generator.

This achieves the advantage that the energy supply device automatically changes over between the first operating state and the second operating state as soon as the load current falls below or exceeds the current threshold value.

In one advantageous example of the energy supply device, the signal generator is designed to reduce the voltage amplitude of the output voltage of the energy supply device to a settable first or prestored first voltage amplitude value if the sensed current amplitude falls below the first current threshold value. The first current threshold value is preferably stored or can be stored in a memory of the signal generator. With a reduction in the output voltage, the output current of the energy supply device can be reduced at the same time, with the result that the energy supply device changes from the first operating state to the second operating state automatically, that is to say without an additional energy source.

This achieves the advantage that the energy supply device automatically saves energy.

In one advantageous example of the energy supply device, the signal generator is designed to reduce the voltage amplitude of the output voltage of the energy supply device in the first operating state after expiry of a settable or prestored first delay time interval. After a first sensing of a current amplitude below the first current threshold value, the measuring assembly carries out a further sensing of the current amplitude after expiry of the first delay time interval. If the further sensed current amplitude is likewise below the first current threshold value, the signal generator reduces the voltage amplitude of the output voltage of the energy supply device. For example, the first delay interval comprises a period of several seconds, for example 30, 20, 10, 5 or 3 seconds.

This achieves the advantage that a transition from the first operating state to the second operating state cannot be initiated by random output current fluctuations.

In one advantageous example of the energy supply device, the signal generator is designed to increase the voltage amplitude of the output voltage of the energy supply device to a settable second or prestored second voltage amplitude value if the sensed current amplitude exceeds the second current threshold value. If the measuring assembly records a sensed current amplitude which exceeds the second current threshold value during operation of the energy supply device in the second operating state, the signal generator increases the voltage amplitude of the output voltage of the energy supply device to a settable second or prestored second voltage amplitude value.

For example, the voltage amplitude is increased from a value in the range of 8 V to 14 V or 10 V to 12 V in the second operating state to a voltage amplitude having a value of between 20 V and 60 V or between 20 V and 28 V or to 24 V, for example, in the first operating state.

This achieves the advantage that the energy supply device automatically changes from the second operating state to the first operating state.

In one advantageous example of the energy supply device, the signal generator is designed to increase the voltage amplitude of the output voltage of the energy supply device immediately or after expiry of a prestored second delay time interval after it has been detected that the second current threshold value of the current amplitude has been exceeded. The prestored second delay time interval comprises, for example, the same period as the first delay time interval. For example, the second delay interval comprises a period of several seconds, for example 30, 20, 10, 5 or 3 seconds.

It is also conceivable, for example, for the second delay time interval to comprise a shorter period than the first delay time interval, for example 20, 10, 5, 3 or 1 seconds.

If the voltage amplitude of the output voltage is increased immediately, the voltage amplitude of the output voltage is increased in a period of less than one second, for example. The switching delay is based on the circuit properties of the components of the energy supply device.

This achieves the advantage that a transition from the second operating state to the first operating state cannot be initiated by random output current fluctuations.

In one advantageous example of the energy supply device, the measuring assembly has a measuring resistor. The measuring resistor is designed to record the current amplitude of the output current on the basis of a voltage drop across the measuring resistor. For example, the measuring resistor is provided in the form of a measuring shunt. A measuring shunt is a low-value electrical resistor which is used to measure the electrical current. The current which flows through a measuring shunt causes a voltage drop which is proportional to it and is measured. The measuring shunt resistor is connected in parallel with a measuring circuit and then records its voltage drop. Since higher current intensities cannot be directly measured, they are passed through a measuring shunt resistor and the resulting voltage drop is measured. The resistance value of measuring shunt resistors is accordingly in the milli-ohm range or below at several tenths or hundredths of a milli-ohm.

This achieves the advantage that the current amplitude of the output current can be sensed by the measuring assembly of the energy supply device.

In one advantageous example of the energy supply device, the signal generator has a transformer with a primary side, to which an input voltage can be applied, and with a secondary side for outputting the output voltage. The transformer of the signal generator has a primary winding which is directly fed with the AC voltage from the energy supply network and the network frequency of the energy supply network. The transformer of the signal generator converts the input voltage, that is to say the AC voltage from the energy supply network, to the required output voltage value (s) and ensures galvanic separation from the mains.

The secondary AC voltage on the secondary side of the transformer can be converted, by means of a rectifier and a smoothing capacitor, to a DC output voltage which can then be provided at the output of the signal generator. A downstream linear regulator and a buffer capacitor also possibly ensure an output voltage which can be kept constant.

This achieves the advantage that any desired output voltage can be applied to the energy supply device.

According to a second aspect of the disclosure, the object is achieved by means of a method for operating an energy supply device, the energy supply device having a first operating state and a second operating state, a measuring assembly for sensing a current amplitude of an output current of the energy supply device and a signal generator for controlling a voltage amplitude of the output voltage of the energy supply device.

The method comprises sensing a current amplitude of the output current of the energy supply device by means of the measuring assembly; reducing a voltage amplitude of the output voltage of the energy supply device in the first operating state of the energy supply device by means of the signal generator in order to change to the second operating state if the sensed current amplitude falls below a first current threshold value.

The method also comprises increasing the voltage amplitude of the output voltage of the energy supply device in the second operating state of the energy supply device by means of the signal generator in order to change to the first operating state if the sensed current amplitude exceeds a second current threshold value.

The output power and therefore the output voltage and the output current are set to a higher absolute value in the first operating state than in the second operating state. If the energy supply device changes from the first operating state to the second operating state, the output voltage of the energy supply device is reduced by 30% to 80%, for example, or by 50%, for example. The voltage amplitude of the output voltage of the energy supply device is reduced from 2.4 V to 10-12 V, for example, in order to change from the first operating state to the second operating state.

In this case, the output current of the energy supply device is reduced by 5-20% or more below the rated current so that the energy supply device changes from the first operating state to the second operating state.

The measuring assembly repeatedly senses the current amplitude of the output current at intervals of time.

The sensed current amplitude is compared with the first current threshold value and with the second current threshold value by the signal generator. The second current threshold value is set to be equal to the second current threshold value, for example, or is prestored. A lower or higher current threshold value can also be set or prestored for the second current threshold value, for example.

In the case of a lower second current threshold value, a consumer which is connected to the energy supply device and has a load with a low load current and a low load voltage can be detected by the energy supply device. In accordance with the method according to the disclosure, the energy supply device then automatically changes from the second operating state to the first operating state.

The energy supply device is a power supply unit, for example.

In the method according to the disclosure, the first operating state is set as an active state, and the second operating state is set as an energy-saving state, in particular a stand-by mode or a sleep mode. In the active state, the output voltage and the output current are each set to a value which allows operation of the electrical device connected to the energy supply device, whereas, in the energy-saving state, the output voltage and the output current are each set to a value which restricts operation of the electrical device connected to the energy supply device.

The method according to the disclosure achieves the advantage that a transition between the first operating state and the second operating state of the energy supply device is automatically effected.

In one advantageous example of the method, the sensed current amplitude is compared with the first current threshold value or the second current threshold value or the further current threshold value by the signal generator. The signal generator compares the sensed current amplitude with the current threshold values at predetermined times. For example, the predetermined times are determined by expiry of equidistant intervals of time which are in the seconds range, for example.

For example, after expiry of 30, 20, 10 or 5 seconds in each case, the current amplitude is sensed by the measuring assembly and is then compared with the first current threshold value or the second current threshold value or the further current threshold value by the signal generator.

Depending on the connected consumers and their loads, that is to say their load voltages and load currents, the first current threshold value or the second current threshold value or the further current threshold value is set or prestored.

This achieves the advantage that the method according to the disclosure can be applied to consumers having different loads and a transition between the first operating state and the second operating state is effected as soon as the load current falls below the first current threshold value or the load current exceeds the second current threshold value.

In one advantageous example of the method, the signal generator reduces the voltage amplitude of the output voltage of the energy supply device to a settable first or prestored first voltage amplitude value if the sensed current amplitude falls below the first current threshold value. For example, the first current threshold value is stored in a memory of the signal generator.

With a reduction in the output voltage, the output current of the energy supply device is reduced at the same time, with the result that the energy supply device changes from its first operating state to the second operating state automatically, that is to say without an additional energy source.

This achieves the advantage that the energy provided at the output of the energy supply device is automatically reduced by using the method according to the disclosure.

In one advantageous example of the method, the signal generator reduces the voltage amplitude of the output voltage of the energy supply device in the first operating state after expiry of a settable or prestored first delay time interval. After a first sensing of a current amplitude below the first current threshold value, the measuring assembly records a further current amplitude after expiry of the first delay time interval. If the further sensed current amplitude is also below the first current threshold value, the signal generator reduces the voltage amplitude of the output voltage of the energy supply device. For example, the first delay interval comprises a period of several seconds, for example 30, 20, 10, 5 or 3 seconds.

This achieves the advantage that a transition from the first operating state to the second operating state cannot be initiated by random output current fluctuations.

In one advantageous example of the method, the signal generator increases the voltage amplitude of the output voltage of the energy supply device to a settable second or prestored second voltage amplitude value if the sensed current amplitude exceeds the current threshold value or the further current threshold value. If the measuring assembly records a sensed current amplitude which exceeds the second current threshold value during operation of the energy supply device in the second operating state, the signal generator increases the voltage amplitude of the output voltage of the energy supply device to a settable second or prestored second voltage amplitude value.

For example, the voltage amplitude is increased from a value in the range of 8 V to 14 V or 10 V to 12 V, for example, in the second operating state to a voltage amplitude having a value of between 20 V and 60 V or between 20 V and 28 V, for example, or to 24 V, for example, in the first operating state.

This achieves the advantage that the energy supply device automatically changes from the second operating state to the first operating state when using the method.

In one advantageous example of the method, the signal generator increases the voltage amplitude of the output voltage of the energy supply device immediately or after expiry of a prestored second delay time interval after it has been detected that the second current threshold value of the current amplitude has been exceeded. The prestored second delay time interval comprises, for example, the same period as the first delay time interval.

For example, the second delay interval comprises a period of several seconds, for example 30, 20, 10, 5 or 3 seconds. For example, the second delay time interval comprises a shorter period than the first delay time interval, for example 20, 10, 5, 3 or 1 seconds.

If the voltage amplitude of the output voltage is increased immediately, the voltage amplitude of the output voltage is increased in a period of less than one second. The switching delay is then based on the circuit properties of the components of the energy supply device which are used when using the method.

The method according to the disclosure achieves the advantage that a transition from the second operating state to the first operating state cannot be initiated by random output current fluctuations.

According to a third aspect of the disclosure, the object is achieved by means of a method for operating an energy supply device, the energy supply device having a first operating state and a second operating state. A current amplitude of the output current of the energy supply device is sensed. Furthermore, a voltage amplitude of the output voltage of the energy supply device in the first operating state of the energy supply device is reduced by means of a signal generator in order to change to the second operating state if the sensed current amplitude falls below a first current threshold value; and the voltage amplitude of the output voltage of the energy supply device in the second operating state of the energy supply device is increased by means of the signal generator in order to change to the first operating state if the sensed current amplitude exceeds a second current threshold value.

The output power and therefore the output voltage and the output current are set to a higher absolute value in the first operating state than in the second operating state.

If the energy supply device changes from the first operating state to the second operating state, the output voltage of the energy supply device is respectively reduced by 30% to 80%, for example, or by 50%, for example. The voltage amplitude of the output voltage of the energy supply device is reduced from 24 V to 10-12 V, for example, in order to change from the first operating state to the second operating state.

In this case, the output current of the energy supply device is reduced by 5-20% or more below the rated current, for example, in order to change from the first operating state to the second operating state.

The current amplitude of the output current is repeatedly sensed at intervals of time. The sensed current amplitude is compared with the first current threshold value and the second current threshold value. The second current threshold value is set to be equal to the second current threshold value, for example, or is prestored. A lower or higher current threshold value can also be set or prestored for the second current threshold value, for example.

In accordance with the method according to the disclosure, the energy supply device automatically changes from the second operating state to the first operating state. In the method according to the disclosure, the first operating state is set as an active state, and the second operating state is set as an energy-saving state, in particular a stand-by mode or a sleep mode.

In the active state, the output voltage and the output current are each set to a value which allows operation of an electrical device connected to the energy supply device, whereas, in the energy-saving state, the output voltage and the output current are each set to a value which restricts operation of the electrical device connected to the energy supply device.

This achieves the advantage that a transition between the first operating state and the second operating state is automatically effected.

BRIEF DESCRIPTION OF THE DRAWINGS

Examples of the principles of this disclosure are illustrated in the drawings and are described in more detail below.

In the drawings.

DETAILED DESCRIPTION

Figure 1:
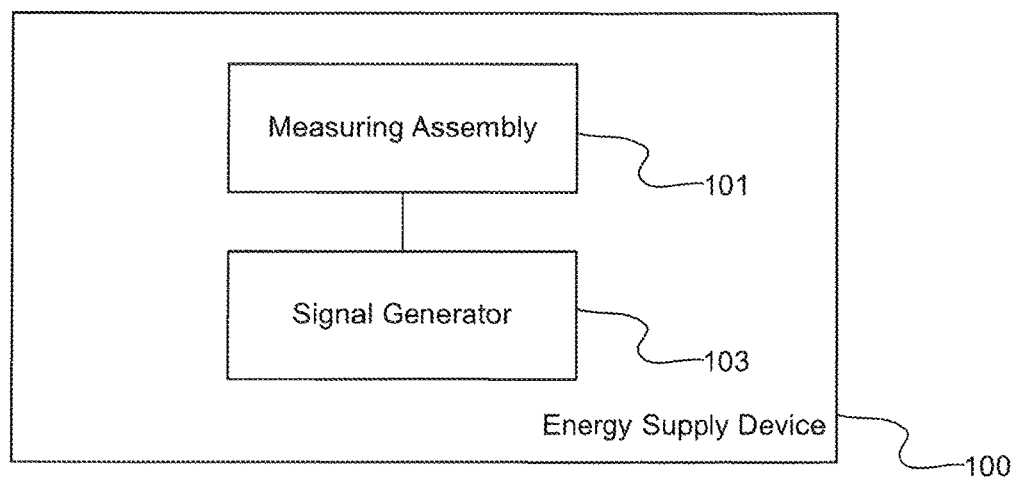
FIG. 1 shows a schematic illustration of an energy supply device.

FIG. 1 shows a schematic illustration of an energy supply device 100 having a measuring assembly 101 for sensing a current amplitude of the output current of the energy supply device 100 and having a signal generator 103 for producing the output voltage and the output current of the energy supply device 100.

Figure 2:
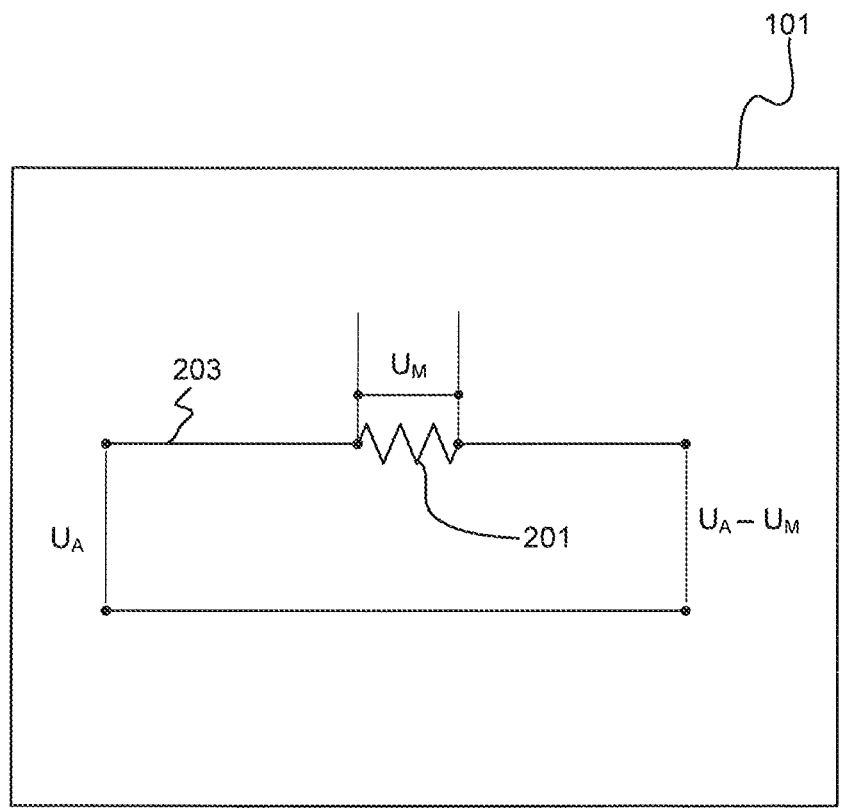
FIG. 2 shows a schematic illustration of a measuring assembly of the energy supply device.

The measuring assembly 101 is schematically illustrated with further details in FIG. 2. The measuring assembly 101 has a measuring resistor 201 and repeatedly senses the current amplitude of the output current of the energy supply device 100 (see FIG. 1) at intervals of time. The measuring assembly 101 senses the current amplitude of the output current on the basis of a voltage drop UA-UM across the measuring resistor 201. UA denoting the output voltage of the energy supply device and the input to the measuring assembly 101, and UM denoting the voltage across the measuring resistor 201.

The measuring resistor 201 is provided in the form of a measuring shunt, as illustrated in FIG. 2. The current which flows through a measuring resistor 201 causes a voltage drop UA-UM which is proportional to it and is measured. The measuring resistor 201 is connected in parallel with a measuring circuit 203, the voltage drop across the measuring resistor 201 being used to measure the current amplitude. The resistance value of the measuring resistor 201 is, for example, in the milli-ohm range or below at several tenths or hundredths of a milli-ohm.

Figure 3:
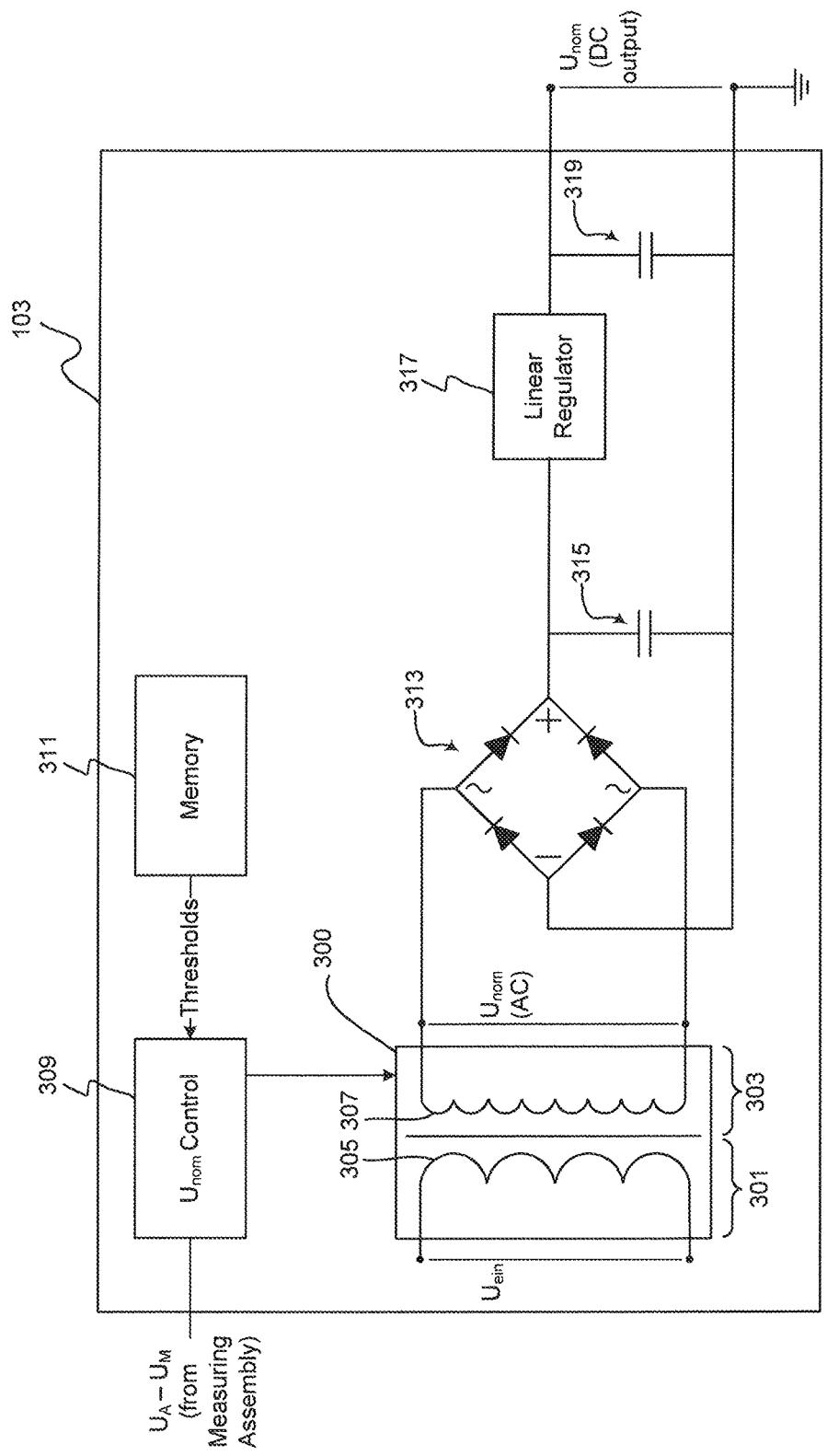
FIG. 3 shows a schematic illustration of a signal generator of the energy supply device.

The signal generator 103 (see FIG. 1) is electrically connected to the measuring assembly 101. FIG. 3 shows a schematic illustration of the signal generator 103 which comprises a transformer 300. The transformer 300 has a primary side 301, to which an input voltage $U_{ein}$ is applied, and a secondary side 303 which then provides a nominal output voltage $U_{nom}$.

The transformer 300 of the signal generator 103 has, on its primary side 301, a primary winding 305 which is directly fed with the input voltage $U_{ein}$, that is to say the AC voltage from the energy supply network and the network frequency of the energy supply network, and has, on its secondary side 303, a secondary winding 307 which provides the output voltage $U_{nom}$. The transformer 300 of the signal generator 103 converts the input voltage $U_{ein}$, that is to say the AC voltage from the energy supply network, to the required output voltage value(s) $U_{nom}$ and ensures galvanic separation from the mains. $U_{nom}$ is set at a $U_{nom}$ control block 309 on the basis of a comparison between the voltage drop UA-UM sensed by the measuring assembly 101 and multiple current threshold values, as discussed with reference to FIGS. 1 and 4-7. The current threshold values may be stored in a memory 311 of the signal generator 103.

The secondary AC voltage on the secondary side 303 of the transformer 300 can be converted, by means of a rectifier 313 and a smoothing capacitor 315, to a DC output voltage which can be provided at the output of the signal generator 103. A downstream linear regulator 317 and a buffer capacitor 319 also possibly provide an output voltage $U_{nom}$ which can be kept constant.

Figure 4:
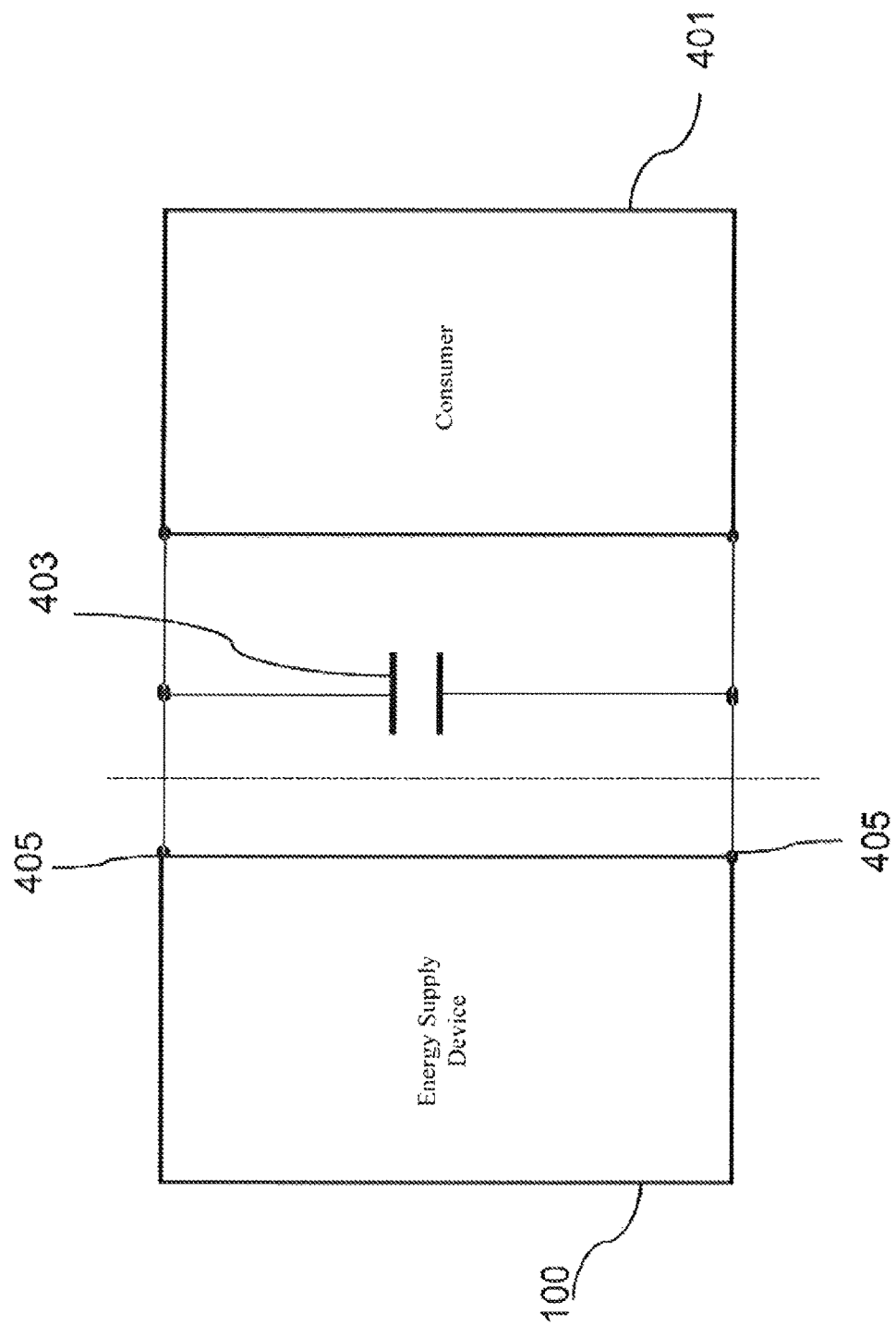
FIG. 4 shows a schematic illustration of the energy supply device with a connected consumer.

FIG. 4 shows a schematic illustration of the energy supply device 100, to the output 405 of which a consumer 401 is connected. A capacitor 403 is connected in parallel with the consumer 401. The capacitor 403 provides a backup capacitance which provides a predetermined minimum power with a minimum load current and a minimum load voltage. Interposing the backup capacitance ensures that a consumer 401 connected to the energy supply device 100 exceeds a current threshold value, in particular the second current threshold value, with the result that the energy supply device 100 changes to its active state in order to automatically supply the connected consumer 401 with energy.

The connected consumer 401 may be an electrical device, a motor, a PLC consumer (programmable logic controller), an industrial installation, a device which can be mounted on top-hat rails, a control cabinet or another electrical consumer. The connected consumer can be operated with DC voltage or with AC voltage.

Figure 5:
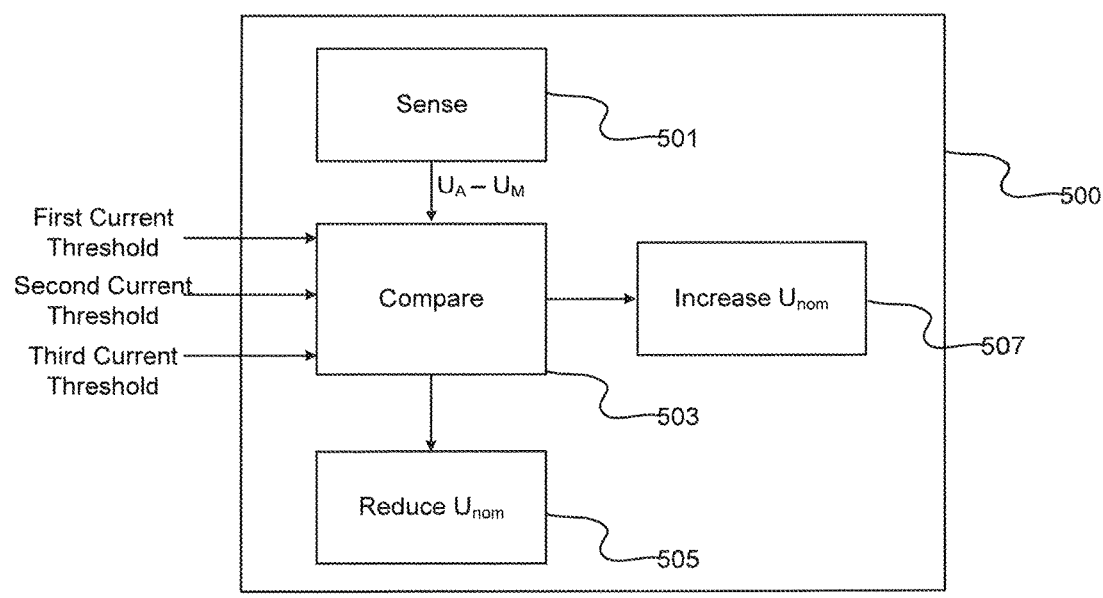
FIG. 5 shows a schematic diagram for the sequence of the method for operating the energy supply device.

FIG. 5 shows a schematic diagram for the sequence of the method 500 for operating an energy supply device 100. The method 500 for operating the energy supply device 100 first of all comprises sensing 501 a current amplitude of the output current 601 of the energy supply device 100 by means of the measuring assembly 101. The sensed current amplitude of the output current 601 is then compared with settable or prestored current threshold values. After comparing 503 with a first current threshold value I1 and a second current threshold value I2, either the output voltage 603 is reduced 505 or the output voltage 603 is increased 507 depending on the result of the comparison 503.

If the energy supply device 100 is in its first operating state 605, its active state, in which the consumer(s) 401 connected to the energy supply device 100 are supplied with energy, the energy supply device 100 changes from its first operating state 605 to its second operating state 607 if a current threshold value which is below a first current threshold value I1 is sensed 501. This transition is effected by reducing 505 the voltage amplitude of the output voltage 603 of the energy supply device 100 to a settable or prestored output voltage value $U_{low}$. The second operating state 607 is an energy-saving state which is operated with the reduced output voltage $U_{low}$.

If the energy supply device 100 is in its second operating state 607, the energy-saving state, the energy supply device 100 changes from its second operating state 607 to its first operating state 605 if a current threshold value which is above a second current threshold value I2 is sensed 501. This transition is effected by increasing 507 the voltage amplitude of the output voltage 603 of the energy supply device 100 to a settable or prestored output voltage value $U_{nom}$. The first operating state 605 is the active state which is operated with the nominal output voltage $U_{nom}$.

Figure 6:
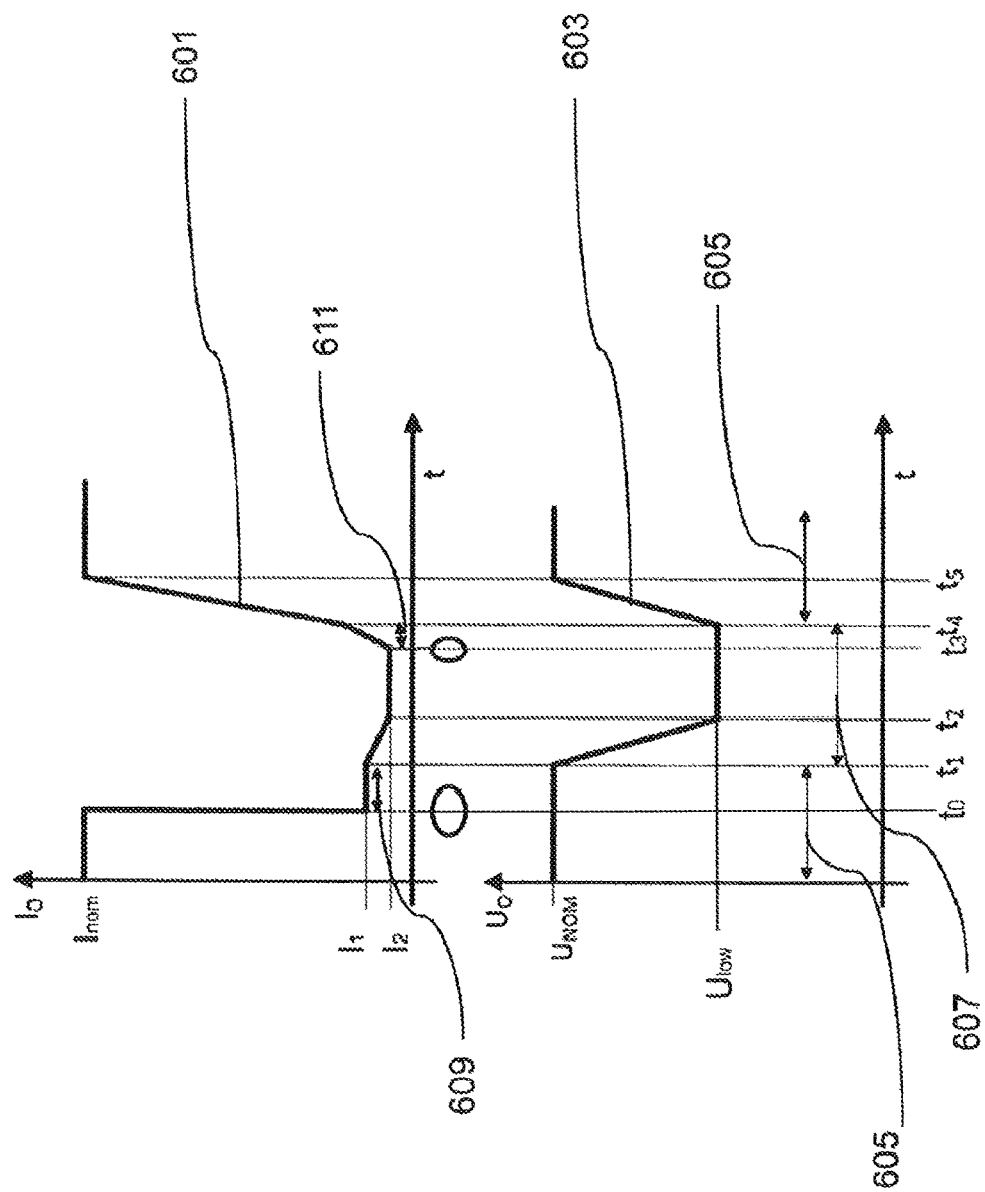
FIG. 6 shows a schematic illustration of the time against the output voltage and the output current of the energy supply device.

FIG. 6 shows a schematic illustration of the output voltage and the output current of the energy supply device. In its first operating state 605, the energy supply device 100 provides an output voltage value $U_{nom}$ and an output current value $I_{nom}$ at its output or is increased to these values, with the result that connected consumers 401 can be supplied with energy. The temporal profile of the amplitude of the output current 601 and the temporal profile of the amplitude of the output voltage 603 are illustrated both in the first operating state 605 and in the second operating state 607 in FIG. 6.

At a time t0, a consumer 401 connected to the energy supply device 100 is switched off, with the result that the amplitude of the output current 601 is reduced to a first current threshold value I1 or to a value below the latter until a time t1, while the amplitude of the output voltage 603 has remained constant at the output voltage value $U_{nom}$. The energy supply device 100 changes over from its first operating state 605 to the second operating state 607 only after expiry of the first delay interval 609 which corresponds to a period t1-t0. This results in the amplitude of the output voltage being reduced to the output voltage value $U_{low}$ and the amplitude of the output current being reduced to the second current threshold value I2 between the times t1 and t2.

For example, the amplitude of the output voltage is reduced from 24 V to 8 V to 16 V or 10-12 V, for example, while the amplitude of the output current is reduced by 5-20% below the amplitude of the rated current.

The remaining output current I2 is repeatedly measured at equidistant intervals of time in the second operating state 607. As long as the amplitude of the output current does not exceed the second current threshold value I2, the energy supply device 100 remains in its second operating state 607. Only if a consumer 401 having a load is connected to the energy supply device 100 at a time t3 is the amplitude of the output current 601 through the consumer 401 increased until a time t4, whereas the amplitude of the output voltage 603 is kept constant at the output voltage value $U_{low}$. Connecting the consumer 401 having a backup capacitance can also result in a current peak in the amplitude of the output current 601 (not illustrated). In both cases, the increase in the amplitude of the output current is evaluated as the end of the second operating state 607. Consequently, at the time t4, that is to say after expiry of a second delay interval 611 which comprises the period t4-t3, the amplitude of the output current 601 is increased to the output current $I_{nom}$ and the amplitude of the output voltage is increased to the nominal output voltage $U_{nom}$ 603 until the time t5.

At the time t5, the energy supply device provides an output voltage $U_{nom}$ and an output current $I_{nom}$ which can be used to operate the connected consumer 401. The output voltage $U_{nom}$ is, for example, 24 V or more. For example, 60 V for the output voltage $U_{nom}$ are not exceeded in order to avoid exceeding a safety range. The output current $I_{nom}$ is in a range between 40 A and 80 A, for example.

Figure 7:
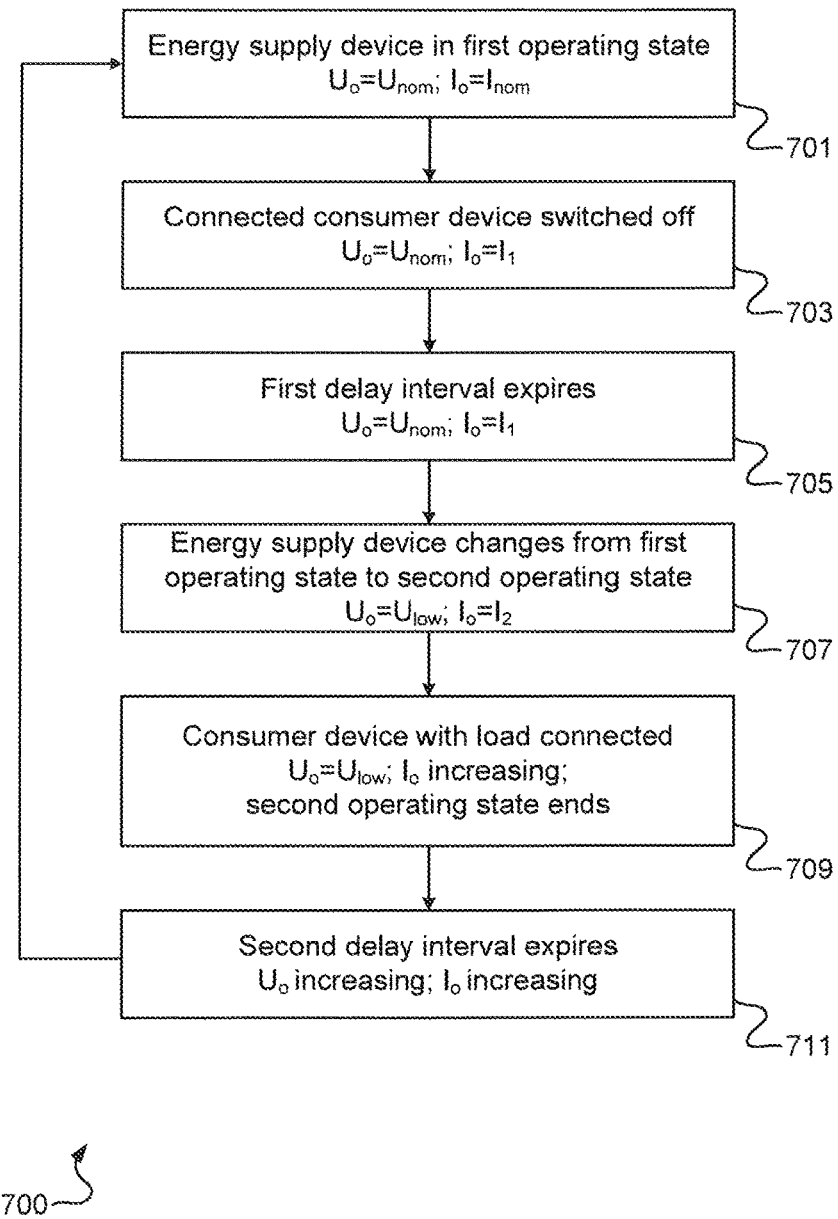
FIG. 7 shows a flowchart of exemplary method for operating the energy supply device.

FIG. 7 shows a flowchart of exemplary process at the energy supply device. At block 701, in its first operating state 605, the energy supply device 100 provides an output voltage value $U_{nom}$ and an output current value $I_{nom}$ at its output or is increased to these values, with the result that connected consumers 401 can be supplied with energy. The temporal profile of the amplitude of the output current 601 and the temporal profile of the amplitude of the output voltage 603 are illustrated both in the first operating state 605 and in the second operating state 607 in FIG. 6.

At block 703 at a time t0, a consumer 401 connected to the energy supply device 100 is switched off, with the result that the amplitude of the output current 601 is reduced to a first current threshold value I1 or to a value below the latter until a time t1, while the amplitude of the output voltage 603 has remained constant at the output voltage value $U_{nom}$.

At block 705, the first delay interval 609 expires. At block 707, the energy supply device 100 changes over from its first operating state 605 to the second operating state 607 only after expiry of the first delay interval 609 which corresponds to a period t1-t0. This results in the amplitude of the output voltage being reduced to the output voltage value $U_{low}$ and the amplitude of the output current being reduced to the second current threshold value I2 between the times t1 and t2.

For example, the amplitude of the output voltage is reduced from 24 V to 8 V to 16 V or 10-12 V, for example, while the amplitude of the output current is reduced by 5-20% below the amplitude of the rated current.

The remaining output current I2 is repeatedly measured at equidistant intervals of time in the second operating state 607. As long as the amplitude of the output current does not exceed the second current threshold value I2, the energy supply device 100 remains in its second operating state 607.

At block 709, if a consumer 401 having a load is connected to the energy supply device 100 at a time t3 is the amplitude of the output current 601 through the consumer 401 increased until a time t4, whereas the amplitude of the output voltage 603 is kept constant at the output voltage value $U_{low}$. Connecting the consumer 401 having a backup capacitance can also result in a current peak in the amplitude of the output current 601 (not illustrated). In both cases, the increase in the amplitude of the output current is evaluated as the end of the second operating state 607. At block 711, a second delay interval 611 expires. Consequently, at block 713 at the time t4, that is to say after expiry of a second delay interval 611 which comprises the period t4-t3, the amplitude of the output current 601 is increased to the output current $I_{nom}$ and the amplitude of the output voltage is increased to the nominal output voltage $U_{nom}$ 603 until the time t5.

At the time t5, the energy supply device provides an output voltage $U_{nom}$ and an output current $I_{nom}$ which can be used to operate the connected consumer 401, and the energy supply device has returned to the first operating state at block 701. The output voltage $U_{nom}$ is, for example, 24 V or more. For example, 60 V for the output voltage $U_{nom}$ are not exceeded in order to avoid exceeding a safety range. The output current $I_{nom}$ is in a range between 40 A and 80 A, for example.

All features explained and shown in connection with individual examples of the principles of this disclosure can be provided in a different combination in the subject matter according to the disclosure in order to simultaneously achieve their advantageous effects.

The scope of protection of the present disclosure is given by the claims and is not restricted by the features explained in the description or shown in the Figures.

LIST OF REFERENCE NUMBERS

100 Energy supply device
101 Measuring assembly
103 Signal generator
201 Measuring resistor
203 Measuring circuit
300 Transformer
301 Primary side
303 Secondary side
305 Primary winding
307 Secondary winding
309 $U_{nom}$ Control
311 Memory
313 Rectifier
315 Smoothing capacitor
317 Linear regulator 319 Buffer capacitor
401 Consumer
403 Capacitor
405 Output
500 Method
501 Sensing
503 Comparing
505 Reducing $U_{nom}$
507 Increasing $U_{nom}$
601 Output current
603 Output voltage
605 First operating state
607 Second operating state
609 First delay interval
611 Second delay interval
I1 First current threshold value
I2 Second current threshold value
$I_{nom}$ Amplitude of the output current in the first operating state
$U_{nom}$ Amplitude of the output voltage in the first operating state
$U_{low}$ Amplitude of the output voltage in the second operating state
$U_A$ Output voltage at the output of the measuring assembly
$U_M$ Voltage across the measuring resistor
$U_A$-$U_M$ Voltage drop
$U_{ein}$ Input voltage
t0 Time
t1 Time
t2 Time
t3 Time
t4 Time
t5 Time

What is claimed is:

1. An energy supply device configured to provide an output voltage and an output current, the energy supply device having a first operating state and a second operating state, comprising:
a measuring assembly configured to sense a current amplitude of the output current of the energy supply device; and
a signal generator configured to produce the output voltage and the output current, wherein the signal generator is configured to:
reduce a voltage amplitude of the output voltage of the energy supply device in the first operating state of the energy supply device after expiry of a settable or prestored first delay time interval to change to the second operating state if the sensed current amplitude falls below a first current threshold value; and
increase a voltage amplitude of the output voltage of the energy supply device in the second operating state of the energy supply device to change to the first operating state if the sensed current amplitude exceeds a second current threshold value.

2. The energy supply device according to claim 1, wherein the first operating state is an active state, and the second operating state is an energy-saving state, wherein the energy-saving state comprises a stand-by mode or a sleep mode.

3. The energy supply device according to claim 1, wherein the second current threshold value is the first current threshold value or a further current threshold value.

4. The energy supply device according to claim 3, wherein the first current threshold value or the second current threshold value or the further current threshold value is configured to be settable or prestored.

5. The energy supply device according to claim 3, wherein the signal generator is configured to compare the sensed current amplitude with the first current threshold value or the second current threshold value or the further current threshold value.

6. The energy supply device according to claim 1, wherein the signal generator is configured to reduce the voltage amplitude of the output voltage of the energy supply device to a settable first or prestored first voltage amplitude value if the sensed current amplitude falls below the first current threshold value.

7. The energy supply device according to claim 1, wherein the signal generator comprises a transformer having a primary side, wherein an input voltage can be applied to the primary side, and the transformer with a secondary side configured to output the output voltage.

8. The energy supply device according to claim 1, wherein the signal generator is configured to increase the voltage amplitude of the output voltage of the energy supply device to a settable second or prestored second voltage amplitude value if the sensed current amplitude exceeds the second current threshold value.

9. The energy supply device according to claim 1, wherein the signal generator is configured to increase the voltage amplitude of the output voltage of the energy supply device immediately or after expiry of a prestored second delay time interval after detecting that the second current threshold value of the current amplitude has been exceeded.

10. The energy supply device according to claim 1, wherein the measuring assembly comprises a measuring resistor.

11. A method for operating an energy supply device, comprising:
sensing, at a measuring assembly, a current amplitude of an output current of the energy supply device;
controlling, with a signal generator, a voltage amplitude of an output voltage of the energy supply device, wherein controlling the voltage amplitude comprises:
reducing the voltage amplitude of the output voltage of the energy supply device in a first operating state of the energy supply device after expiry of a settable or prestored first delay time interval to change to a second operating state if the sensed current amplitude falls below a first current threshold value; and
increasing the voltage amplitude of the output voltage of the energy supply device in the second operating state of the energy supply device to change to the first operating state if the sensed current amplitude exceeds a second current threshold value.

12. The method according to claim 11, further comprising comparing the sensed current amplitude with the first current threshold value or the second current threshold value or a further current threshold value by the signal generator.

13. The method according to claim 12, wherein the signal generator increases the voltage amplitude of the output voltage of the energy supply device to a settable second or prestored second voltage amplitude value if the sensed current amplitude exceeds the second current threshold value or the further current threshold value.

14. The method according to claim 13, further comprising limiting the increase of the voltage amplitude of the output voltage to avoid exceeding a safety range.

15. The method according to claim 11, further comprising reducing, by the signal generator, the voltage amplitude of the output voltage of the energy supply device to a settable first or prestored first voltage amplitude value if the sensed current amplitude falls below the first current threshold value.

16. The method according to claim 11, wherein the sensing further comprises repeatedly recording the voltage drop across a measuring resistor at a time interval.

17. The method according to claim 16, wherein the time interval is regular.

18. The method according to claim 11, wherein the controlling further comprises applying an input voltage to a primary side of a transformer and outputting the output voltage from a secondary side of the transformer.

19. The method according to claim 18, further comprising converting the output voltage from the secondary side of the transformer from an AC voltage to a DC voltage.

* * * * *

UNITED STATES PATENT AND TRADEMARK OFFICE
CERTIFICATE OF CORRECTION

PATENT NO. : 10,033,219 B2
APPLICATION NO. : 15/314218
DATED : July 24, 2018
INVENTOR(S) : Zeuch et al.

Page 1 of 1

It is certified that error appears in the above-identified patent and that said Letters Patent is hereby corrected as shown below:

On the Title Page

Item (73):
Delete "Phoenix Contact GmbH Co. KG" and insert --Phoenix Contact GmbH & Co. KG--.

Signed and Sealed this
Seventeenth Day of March, 2020

Andrei Iancu
*Director of the United States Patent and Trademark Office*